2,758,114
QUATERNARY AZACYCLOALKANE COMPOUNDS

Karl Miescher, Riehen, and Adrian Marxer, Basel, Switzerland, assignors to Ciba Pharmaceutical Products, Inc., Summit, N. J.

No Drawing. Application March 17, 1953,
Serial No. 342,978
Claims priority, application Switzerland April 3, 1952
10 Claims. (Cl. 260—247.5)

The present invention relates to quaternary azacycloalkanes. More particularly the invention relates to 3-methyl-N:N'-dialkyl-3-aza-pentylene-(1:5)-bis-quaternary-aza-cycloalkanes, wherein the alkyl radicals contain 1–2 carbon atoms.

Tertiary 3-aza-pentylene-(1:5)-di-trialkyl-ammonium compounds, in which the alkyl radicals contain 1–3 carbon atoms, are disclosed and claimed in our application Ser. No. 142,712 filed February 6, 1950 for Quaternated Aza-Pentane Amines, now Patent No. 2,654,785 issued October 6, 1953. These compounds possess the property of blocking the ganglia. It has been found that this action is very specific, so that even the corresponding trialkylammonium compounds containing a butyl radical possess substantially poorer properties.

The present invention provides quaternary aza-cycloalkane compounds of the formula

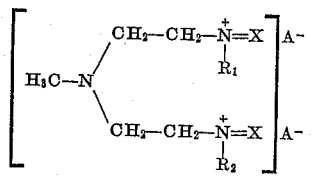

in which $R_1$ and $R_2$ represent alkyl radicals containing 1–2 carbon atoms, $N=X$ represents an aza-cycloalkane-radical such as a pyrrolidino, piperidino or morpholino radical, and the two symbols $A^-$ represent anions which can be connected with one another, especially halogen ions or other non-toxic or therapeutically useful anions, such as those of alkyl sulfuric acids, for example, methyl sulfuric acid, or of alkyl- or aryl-sulfonic acids, or of organic carboxylic acids, for example, acetic acid, propionic acid, succinic acid, tartaric acid, citric acid, or benzoc acid or the hydroxyl ion.

The new compounds possess good properties with respect to blocking ganglia and can be used as medicaments. Particularly valuable are 3-methyl-N:N'-dialkyl-3-azapentylene-(1:5)-bis-pyrrolidinium and piperidinium compounds, and especially 3-methyl-N:N'-diethyl-3-azapentylene-(1:5)-bis-pyrrolidinium dibromide of the formula

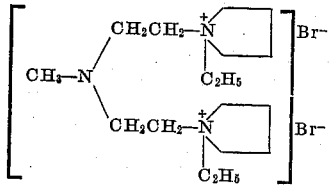

and 3:N:N'-trimethyl-3-aza-pentylene-(1:5)-bis-piperidinium diiodide of the formula

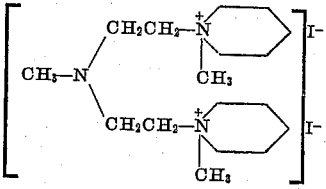

The aforesaid quaternary aza-cycloalkane compounds are made by treating a 3-methyl-3-aza-pentylene-(1:5)-bis-aza-cycloalkane of the formula

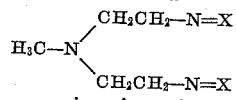

in which X has the meaning given above, with a quaternating agent which is capable of introducing an alkyl radical containing 1–2 carbon atoms. As quaternating agents there are suitable more especially reactive esters of the appropriate alcohols, for example, alkyl halides, such as methyl or ethyl chloride, methyl or ethyl bromide, or methyl or ethyl iodide, and also dialkyl sulfates, such as dimethyl sulfate or diethyl sulfate, alkyl- or aryl-sulfonic acid esters such as para-toluene-sulfonic acid methyl ester. The reaction is advantageously conducted in the presence of a solvent such as alcohol or acetone.

The quaternary ammonium salts obtained by the process of the invention can be converted into their quaternary ammonium hydroxides, for example, by reaction of the halides with silver oxide, or by reaction of the sulfates with barium hydroxide or by treating the quaternary salts with an anion exchanger. From the resulting bases there may be made by reaction with acids the quaternary salts of inorganic or organic acids, such, for example, as hydrochloric acid, hydrobromic acid, hydriodic acid, acetic acid, propionic acid, succinic acid, tartaric acid, citric aicd or benzoic acid.

In the case of the starting materials which are new, they can be made by methods analogous to those known for making similar products. For instance they can be prepared by methylating with formaldehyde and formic acid the corresponding 3-aza-pentylene-(1:5)-bis-aza-cycloalkanes, which in turn can be obtained by hydrogenating N-azacyclo-alkano-acetonitriles, for example, N-piperidino-acetonitrile, N-pyrrolidino-acetonitrile, and N-morpholino-acetonitrile.

The following examples illustrate the invention, the parts being by weight unless otherwise stated, and the relationship between parts by weight and parts by volume being the same as that of the gram to the cubic centimeter:

Example 1

25.3 parts of 3-methyl-3-aza-pentylene-(1:5)-bispiperidine are dissolved in 150 parts by volume of absolute alcohol and mixed dropwise, while stirring, with 28.4 parts of methyl iodide in 50 parts by volume of absolute alcohol. The reaction is brought to an end by heating the mixture in an oil bath having a temperature of 90° C. for four hours. The crystals are separated by filtering with suction. The resulting 3:N:N'-trimethyl-3-aza-pentylene-(1:5)-bis-piperidinium diiodide melts at 206–207° C.

Example 2

25.3 parts of 3-methyl-3-aza-pentylene-(1:5)-bispiperidine and 21.8 parts of ethyl bromide are heated with 200 parts by volume of absolute alcohol for 8 hours in a closed vessel at 90° C. while stirring. The solution is filtered and mixed with 200 parts by volume of ethyl acetate. The crystals so obtained melt at 210–213° C. and consist of 3-methyl-N:N'-diethyl-3-aza-pentylene-(1:5)-bis-piperidinium dibromide of the formula

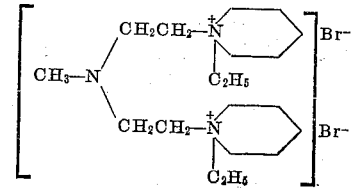

By agitating 23.6 parts of the resulting dibromide with 15 parts of silver oxide in 100 parts by volume of water a solution of 3 - methyl - N:N' - diethyl - 3 - aza - pentylene - (1:5) - bispiperidinium dihydroxide is obtained. The latter solution is mixed with 15.0 parts of dextrotartaric acid. The solution then contains 3 - methyl-N:N' - diethyl - 3 - aza - pentylene - (1:5) - bispiperidinium ditartrate, which is obtained in a crystalline form by evaporating the solution in vacuo and treating it with absolute alcohol.

By treating the dihydroxide solution obtained as described above with 11.8 parts of succinic acid there is obtained 3 - methyl - N:N' - diethyl - 3 - aza - pentylene-(1:5) - bispiperidinium disuccinate. By mixing the dihydroxide solution with 7.4 parts of propionic acid, 3-methyl - N:N' - diethyl - 3 - aza - pentylene - (1:5) - bispiperidinium dipropionate is obtained, and by mixing the dihydroxide solution with 12.2 parts of benzoic acid, 3-methyl - N:N' - diethyl - 3 - aza - pentylene - (1:5) - bispiperidinium dibenzoate is obtained.

The aforesaid dihydroxide can also be made by allowing the dibromide solution to flow through a column of an anion exchanger previously treated with caustic soda solution.

*Example 3*

33.8 parts of 3 - methyl - 3 - aza - pentylene - (1:5)-bis-pyrrolidine are dissolved in 225 parts by volume of absolute alcohol and a solution of 42.6 parts of methyl iodide in 50 parts by volume of absolute alcohol is added dropwise while stirring. The crystallization which sets in immediately is completed by heating the mixture on a water bath for four hours. By filtering with suction there are obtained crystals melting at 202° C. (sintering from 195° C.). There is thus obtained 3:N:N'-trimethyl-3 - aza - pentylene - (1:5) - bis - pyrrolidinium diiodide of the formula

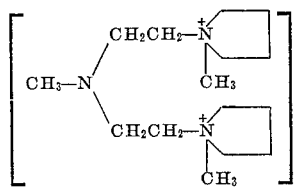

By treating 25.5 parts of the diiodide so obtained with 15 parts of silver oxide in 100 parts by volume of water, there is obtained a solution of 3:N:N' - trimethyl - 3 - aza - pentylene - (1:5) - bis - pyrrolidinium dihydroxide, which is converted by means of 15.0 parts of tartaric acid in a manner analogous to that described in Example 2 into 3:N:N' - trimethyl - 3 - aza - pentylene - (1:5)-dipyrrolidinium ditartrate.

*Example 4*

37.8 parts of 3 - methyl - 3 - aza - pentylene - (1:5)-bis-pyrrolidine are dissolved in 200 parts by volume of absolute alcohol and mixed with a solution of 34.3 parts of ethyl bromide in 50 parts by volume of alcohol while stirring. The solution is heated for four hours in an oil bath having a temperature of 90° C., and then crystals are precipitated by the addition of ethyl acetate. These crystals are 3 - methyl - N:N' - diethyl - aza - pentylene-(1:5) - bis - pyrrolidinium dibromide which melts at 218–219° C. with decomposition.

*Example 5*

25.7 parts of 3-methyl-3-aza-pentylene-(1:5)-bis-morpholine are dissolved in 200 parts by volume of absolute alcohol and of 28.4 parts of methyl iodine in 50 parts by volume of absolute alcohol added dropwise while stirring. The whole is then heated on the water bath for about 4 hours, and, after cooling, the crystals of 3:N:N'-trimethyl- 3-aza-pentylene-(1:5)-bis-morpholinium-diiodide of the formula

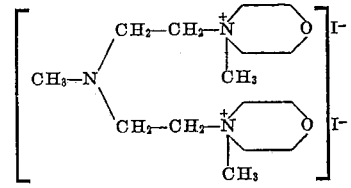

are separated by suction-filtering.

By concentrating the mother liquor and adding 100 parts by volume of ethyl acetate additional quantities of the compound can be obtained. The crystals melt at 176–179° C.

The 3-methyl - 3 - aza-pentylene-(1:5)-bis-aza-cycloalkanes used as starting materials in the examples are obtained by methylating the corresponding 3-aza-pentylene-(1:5)-bis-heterocycles with formaldehyde and formic acid:

The 3-methyl-3-aza-pentylene-bis-piperidine, for instance, is obtained by boiling 120 parts of 3-aza-pentylene-(1:5)-bis-piperidine with 150 parts by volume of 40% formaldehyde solution and 300 parts by volume of 85% formic acid, concentration of the reaction solution under reduced pressure and separating the base with 10-n-caustic soda solution. The product boils at 175° C. under 12 mm. pressure.

The 3-aza-pentylene-1:5-bis-piperidine is obtained as follows:

248 parts of N-piperidino-acetonitrile are dissolved in 600 parts by volume of methyl alcohol, mixed with 50 parts of Raney nickel, and hydrogenated with hydrogen at 50° C. under a pressure of 120 atmospheres. The 3-aza-pentylene-1:5-bis-piperidine thus formed is separated from aminoethyl piperidine by distillation. It boils at 170° C. under 12 mm. pressure.

There can also be obtained in the aforedescribed manner the 3-methyl-3-aza-pentylene-(1:5)-bis-pyrrolidine by methylating 106 parts of 3-aza-pentylene-(1:5)-bis-pyrrolidine with 150 parts by volume of 40% formaldehyde and 300 parts by volume of 85% formic acid. It boils at 147° C. under 12 mm. pressure.

The 3-aza-pentylene-(1:5)-bis-pyrrolidine used for this methylation is obtained as a base of boiling point 146° C. by hydrogenation of 220 parts of N-pyrrolidino-acetonitrile with 50 parts of Raney nickel and hydrogen in the manner described above.

In the same way, there is prepared the 3-methyl-3-aza-pentylene-(1:5)-bis-morpholine by methylating 121.7 parts of 3-aza-pentylene-(1:5)-bis-morpholine with 150 parts by volume of 40% formaldehyde and 300 parts by volume of 85% formic acid. It boils at 177–180° C. under 12 mm. pressure. The 3-aza-pentylene-(1:5)-bis-morpholine is obtained by hydrogenating in the aforesaid manner over 50 parts of Raney nickel 252 parts of N-morpholino-acetonitrile. It boils at 171–175° C. under 12 mm. pressure.

What is claimed:

1. 3-methyl-N:N'-dialkyl - 3 - aza-pentylene-(1:5)-bis-quaternary-azacycloalkanes having 5–6 atoms in the azacycloalkane ring, wherein the alkyl radicals contain 1–2 carbon atoms.

2. A quaternary aza-cycloalkane of the formula

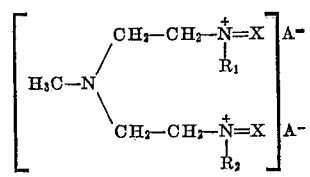

wherein $R_1$ and $R_2$ are alkyl radicals containing 1–2 carbon atoms, $N=X$ stands for an aza-cycloalkane radical selected from the group consisting of pyrrolidino, piperidino and morpholino radicals, and A stands for a nontoxic anion.

3. 3-methyl-N:N'-dialkyl - 3 - aza-pentylene-(1:5)-bis-pyrrolidinium compounds, wherein the alkyl radicals contain 1–2 carbon atoms.

4. 3-methyl-N:N'-dialkyl - 3 - aza-pentylene-(1:5)-bis-pyrrolidinium dihalides, wherein the alkyl radicals contain 1–2 carbon atoms.

5. 3-methyl-N:N'-diethyl - 3 - aza-pentylene-(1:5)-bis-pyrrolidinium dibromide.

6. 3-methyl-N:N'-dialkyl - 3 - aza-pentylene-(1:5)-bis-piperidinium compounds, wherein the alkyl radicals contain 1–2 carbon atoms.

7. 3-methyl-N:N'-dialkyl - 3 - aza-pentylene-(1:5)-bis-piperidinium dihalides, wherein the alkyl radicals contain 1–2 carbon atoms.

8. 3-N:N'-trimethyl - 3 - aza-pentylene-(1:5)-bis-piperidinium diiodide.

9. 3-methyl-N:N'-dialkyl - 3 - aza-pentylene-(1:5)-bis-morpholinium compounds wherein the alkyl radicals contain 1–2 carbon atoms.

10. 3-methyl-N:N'-dimethyl - 3 - aza-pentylene-(1:5)-bis-morpholinium-diiodide.

References Cited in the file of this patent

UNITED STATES PATENTS

| | | |
|---|---|---|
| 2,455,896 | Nagy | Dec. 7, 1948 |
| 2,530,126 | Kwartler et al. | Nov. 14, 1950 |
| 2,541,211 | Cusic et al. | Feb. 13, 1951 |
| 2,582,292 | Sondern et al. | Jan. 15, 1952 |
| 2,604,473 | Sperber et al. | July 22, 1952 |
| 2,654,785 | Miescher et al. | Oct. 6, 1953 |

FOREIGN PATENTS

| | | |
|---|---|---|
| 688,675 | Germany | Feb. 28, 1940 |

OTHER REFERENCES

Marxer et al.: Helvetica Chemica Acta, vol. 34, pp. 924–31 (1951).

Idson et al.: Chem. Reviews, vol. 47, pp. 307–527 (1950).